(12) United States Patent
Petty

(10) Patent No.: US 9,151,183 B2
(45) Date of Patent: Oct. 6, 2015

(54) RETRACTABLE EXHAUST LINER SEGMENT FOR GAS TURBINE ENGINES

(75) Inventor: Dale William Petty, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 965 days.

(21) Appl. No.: 13/301,737

(22) Filed: Nov. 21, 2011

(65) Prior Publication Data
US 2013/0125551 A1 May 23, 2013

(51) Int. Cl.
*F02K 1/00* (2006.01)
*F02C 7/20* (2006.01)
*F01D 25/30* (2006.01)
*F02K 1/82* (2006.01)

(52) U.S. Cl.
CPC .............. *F01D 25/30* (2013.01); *F02K 1/822* (2013.01); *Y02T 50/675* (2013.01); *Y10T 29/49229* (2015.01)

(58) Field of Classification Search
USPC ........... 60/752, 770, 796, 797, 753–766, 772, 60/779; 244/54
See application file for complete search history.

(56) References Cited

U.S. PATENT DOCUMENTS

| | | | |
|---|---|---|---|
| 4,000,854 A | 1/1977 | Konarski et al. | |
| 4,175,385 A | 11/1979 | Nash | |
| 4,411,134 A * | 10/1983 | Moir | ............................. 60/796 |
| 4,854,525 A | 8/1989 | Chee | |
| 5,031,836 A | 7/1991 | Ward | |
| 5,064,144 A | 11/1991 | Chee | |
| 5,390,877 A | 2/1995 | Nightingale | |
| 5,577,381 A | 11/1996 | Eigenbrode et al. | |
| 6,036,142 A | 3/2000 | Yates | |
| 7,770,292 B2 | 8/2010 | Stretton | |
| 2009/0064681 A1* | 3/2009 | Keith et al. | ..................... 60/770 |

FOREIGN PATENT DOCUMENTS

| | | |
|---|---|---|
| GB | 1103431 | 2/1968 |
| GB | 1116542 | 6/1968 |

* cited by examiner

*Primary Examiner* — Phutthiwat Wongwian
*Assistant Examiner* — Arun Goyal
(74) *Attorney, Agent, or Firm* — Carlson, Gaskey & Olds, P.C.

(57) ABSTRACT

A retractable exhaust liner segment according to an exemplary aspect of the present disclosure includes, among other things, a first retractable exhaust liner segment which defines a first flange and a second retractable exhaust liner segment which defines a second flange. A fastener assembly received by the first flange and the second flange is configured to mount the first retractable exhaust liner segment and the second retractable exhaust liner segment. A forward end of the retractable exhaust liner segment overlaps an aft end of an engine structure and an aft end of the retractable exhaust liner segment overlaps a forward end of an exhaust liner in an assembled position. A gap exists between the retractable exhaust liner segment and one of the engine structure and the exhaust liner as the retractable exhaust liner segment is moved along an axis in one direction to a disassembled position and the gap closes as the retractable exhaust liner segment is moved along the axis in other direction to the assembled position. A method of maintaining a gas turbine engine is also disclosed.

21 Claims, 7 Drawing Sheets

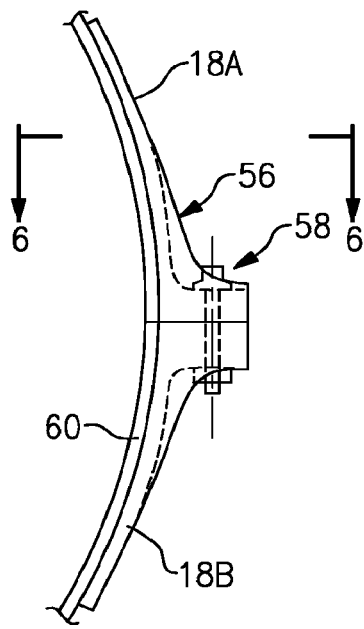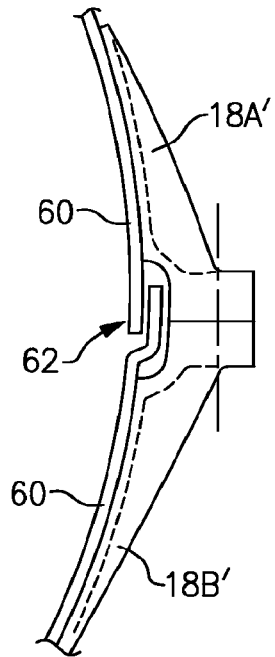
FIG.7  FIG.8
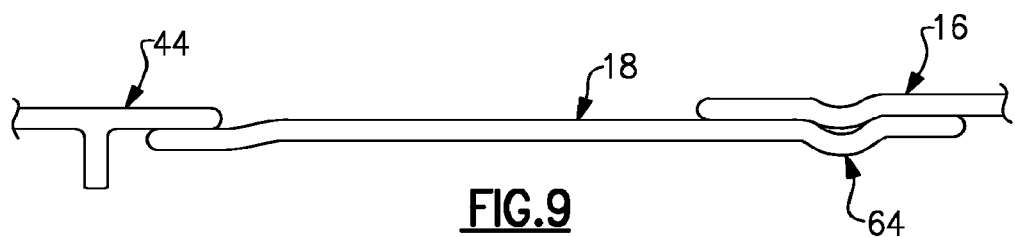
FIG.9
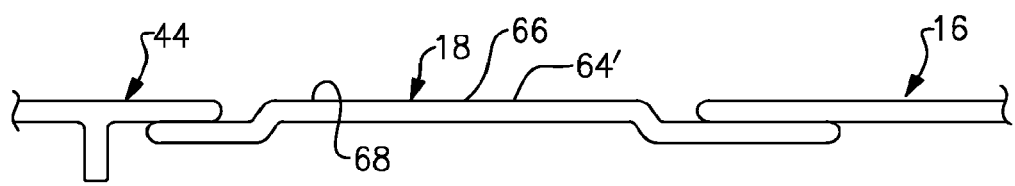
FIG.10

RETRACTABLE EXHAUST LINER SEGMENT FOR GAS TURBINE ENGINES

BACKGROUND

The present disclosure relates to gas turbine engines, and more particularly to an exhaust liner therefor.

Some environments require a propulsion system in which an engine or exhaust system may be dropped or raised from an airframe for maintenance within the shadow of the airframe.

SUMMARY

A retractable exhaust liner segment according to an exemplary aspect of the present disclosure includes a first retractable exhaust liner segment defines a first flange. A second retractable exhaust liner segment defines a second flange. A fastener assembly received by the first flange and the second flange to mount the first retractable exhaust liner segment to the second retractable exhaust liner segment.

A propulsion system according to an exemplary aspect of the present disclosure includes a retractable exhaust liner segment between a gas turbine engine and an exhaust duct.

A method of maintaining a gas turbine engine according to an exemplary aspect of the present disclosure includes moving a retractable exhaust liner segment along an axis; and moving one of a gas turbine engine or an exhaust liner transverse to the axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a side view of a flange of the retractable exhaust liner segment showing a fastener assembly according to one non-limiting embodiment;

FIG. 8 is a side view of a flange of the retractable exhaust liner segment according to another non-limiting embodiment;

FIG. 9 is a side view of a locating feature of the retractable exhaust liner segment according to one non-limiting embodiment;

FIG. 10 is a side view of a locating feature of the retractable exhaust liner segment according to another non-limiting embodiment;

DETAILED DESCRIPTION

Figure 1:
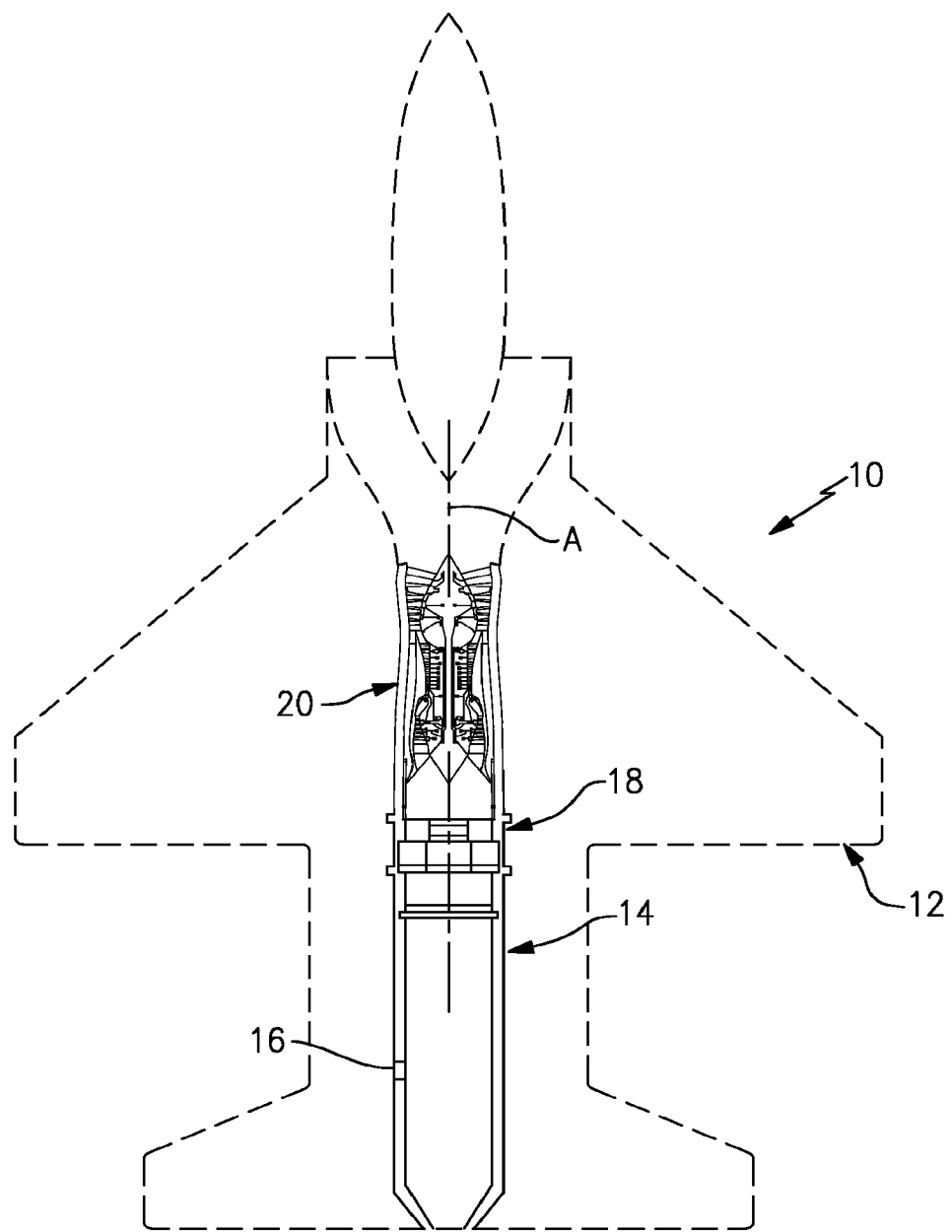
FIG. 1 is a general top perspective of an exemplary aircraft with a propulsion system for use with the present disclosure.

FIG. 1 schematically illustrates an aircraft 10. Some aircraft embed the engines within the vehicle planform to provide an effective balance of aero-performance, packaging, payload integration and survivability. The aircraft 10 in the disclosed non-limiting embodiment is schematically illustrated as a common air vehicle planform, however, it should be appreciated that any aircraft or vehicle will benefit herefrom and that the planform should not be considered limiting.

The aircraft 10 generally includes an airframe 12 and a propulsion system 14. The propulsion system 14 may be embedded within the airframe 12 and include an exhaust liner 16 and a gas turbine engine 20 along a central longitudinal engine axis A. The exhaust liner 16 and engine 20 are separately mounted within the airframe 12 and each is separately removable within the "shadow" of the airframe 12 via a retractable exhaust liner segment 18. That is, each may be removed and replaced vertically from the airframe 12 with respect to the ground rather than axially along the engine axis A. The retractable exhaust liner segment 18 selectively provides axial installation clearances to avoid damage to engine flanges yet assures a desired backpressure seal when installed.

Figure 2:
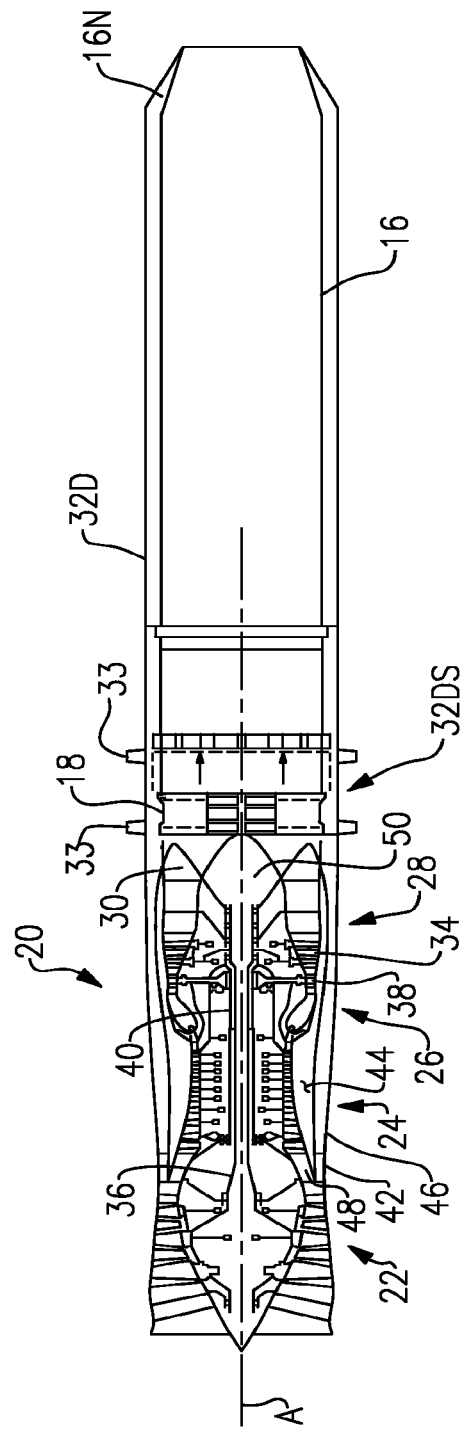
FIG. 2 is a general side sectional view of the propulsion system.

FIG. 2 schematically illustrates the exhaust liner 16 and the gas turbine engine 20. The exhaust liner 16 may be non-linear and/or transition to non-circular to suit airframe requirements. That is, the exhaust liner 16 may be contoured to at least partially extend off the axis A. The exhaust liner 16 may be of a linear or non-linear shape within an outer exhaust duct 32D and may include a nozzle section 16N. The nozzle section 16N may include various fixed, variable, convergent/divergent, two-dimensional and three-dimensional nozzle systems.

The gas turbine engine 20 is disclosed herein as a two-spool turbofan that generally incorporates a fan section 22, a compressor section 24, a combustor section 26, a turbine section 28, and an augmenter section 30. The sections are defined along the central longitudinal engine axis A. Although depicted as an augmented low bypass gas turbine engine in the disclosed non-limiting embodiment, it should be understood that the concepts described herein are applicable to other gas turbine engines including non-augmented engines, geared architecture engines, direct drive turbofans, turboshaft engines, three-spool architecture engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein. It should be appreciated that the inner engine structure 44 as defined herein may include a turbine exhaust case, a stub liner, an augmenter liner, or any structure generally adjacent to an engine tail cone 50 and within the outer engine case structure 42 to direct the engine core flow.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the exhaust liner section 32 and the exhaust liner 16. The secondary flow may be utilized for a multiple of purposes to include, for example, cooling and pressurization. The secondary flow as defined herein is any flow different from the primary combustion gas exhaust core flow.

The outer engine case structure 42 is mounted to the outer exhaust duct 32D via a removable or retractable exhaust duct segment 32Ds via, for example, V-band clamps 33 due to delta pressures an order of magnitude higher than the inner engine structure 44 and the exhaust liner 16. The exhaust duct segment 32Ds may be a split circumferentially in one or more places. That is, the duct segment 32Ds, in one disclosed non-limiting embodiment, includes a cylindrical member defined by a multiple of segments. It should be appreciated that rubber reinforced bellows or other seals may be utilized to permit some relative motion, yet still seal the exhaust duct segment 32Ds between the outer engine case structure 42 and the outer exhaust duct 32D. Once unclamped the bellows may be readily forced away for interior access to the exhaust liner segment 18. That is, the duct segment 32D provides a seal for the secondary flow and generally axially extends along a travel range of the retractable exhaust liner segment 18 (FIG. 3).

Figure 3:
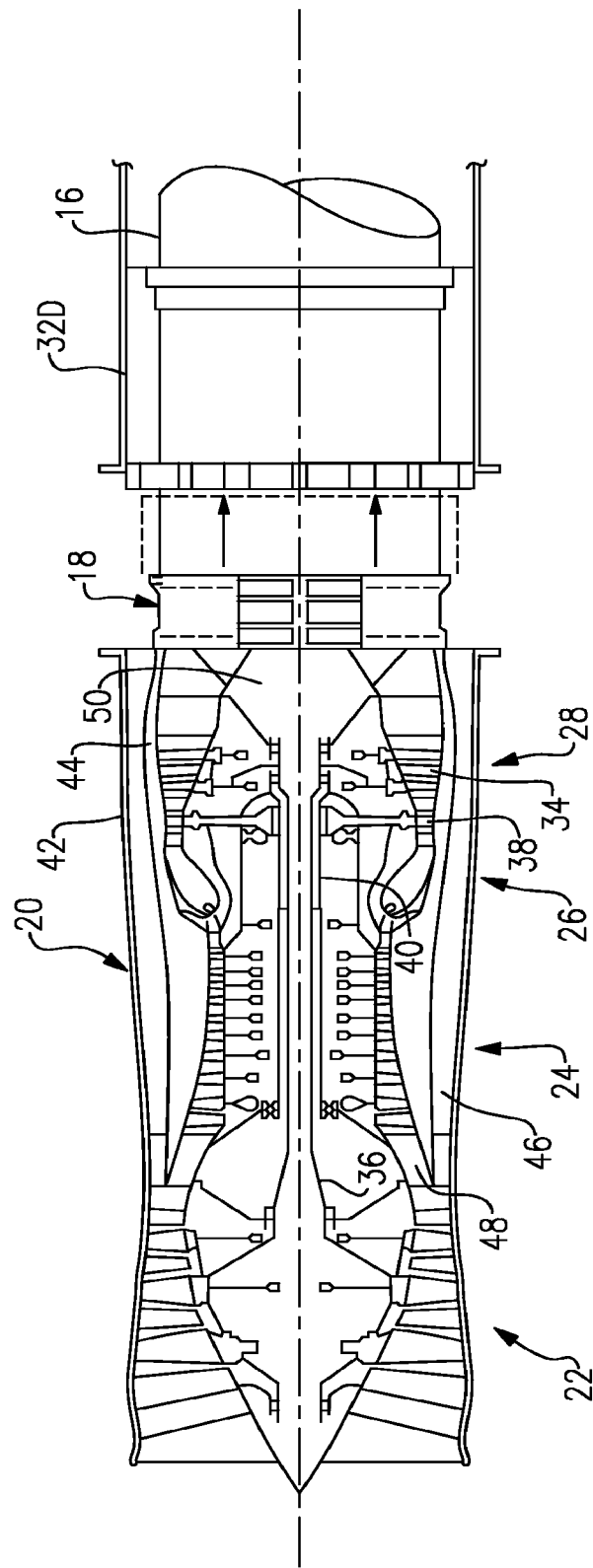
FIG. 3 is a general side sectional view of the propulsion system with a retractable exhaust liner segment in a closed position.
Figure 4:
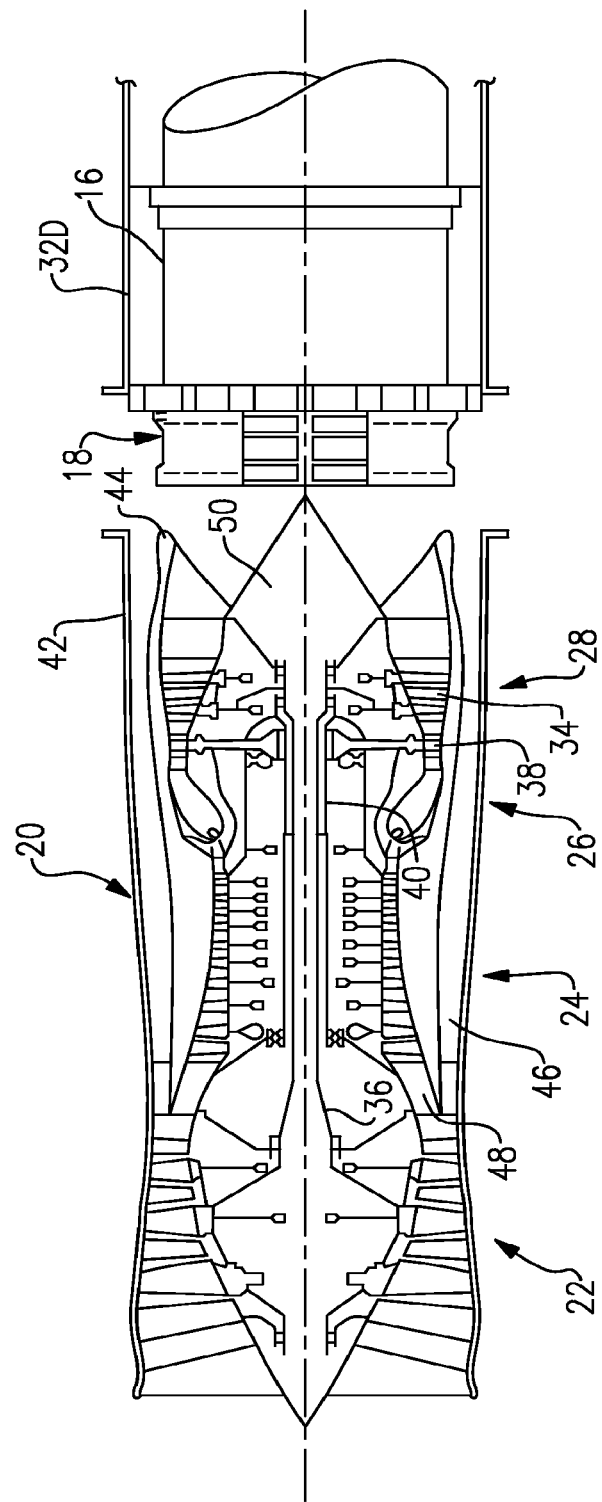
FIG. 4 is a general side sectional view of the propulsion system with a retractable exhaust liner segment in an open position.

The inner engine structure 44 is mounted to the exhaust liner 16 through the retractable exhaust liner segment 18 which may be loosened and then axially telescoped over either the inner engine structure 44 or the exhaust liner 16 along the axis A after removal or retraction of the duct segment 32D (FIG. 3). The retractable exhaust liner segment 18, in one disclosed non-limiting embodiment, provides clearance for the tail cone 50 for a straight vertical engine installation/removal movement transverse to the axis A (FIG. 4).

Figure 5:
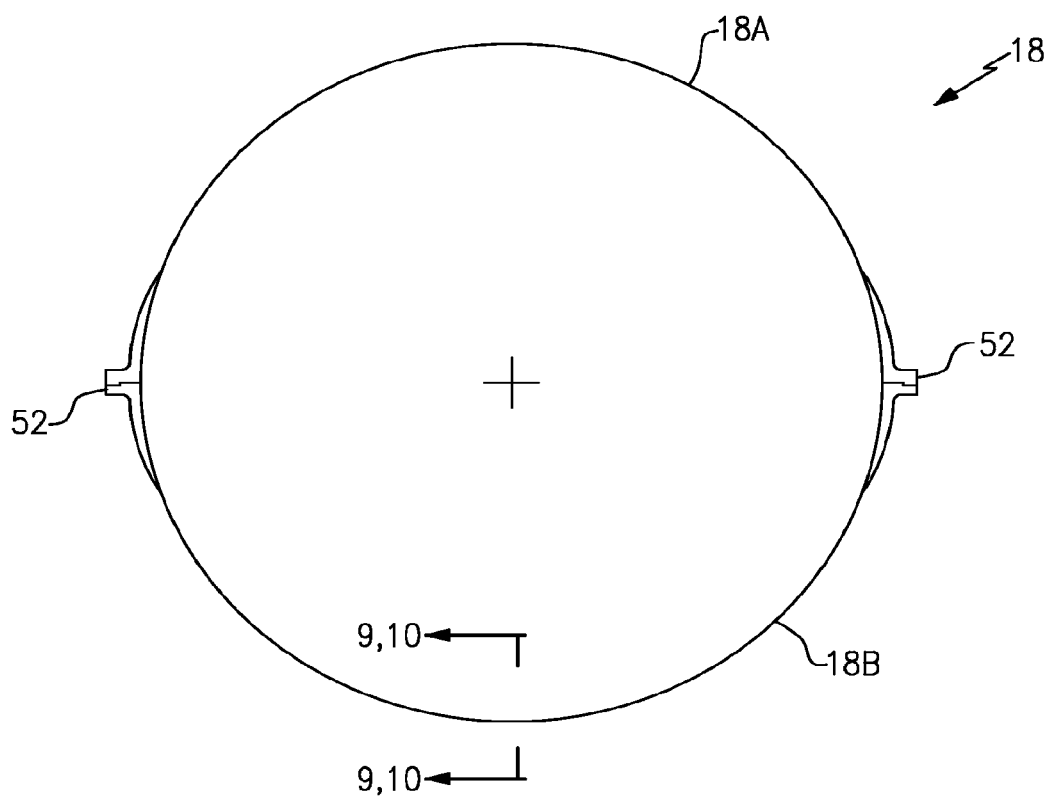
FIG. 5 is a side view of the retractable exhaust liner segment.

With reference to FIG. 5, the retractable exhaust liner segment 18 may be a split ring that is split circumferentially in one or more places (two segments 18A, 18B shown). That is, the retractable exhaust liner section 18 is essentially a cylindrical member defined by a multiple of segments.

Figure 6:
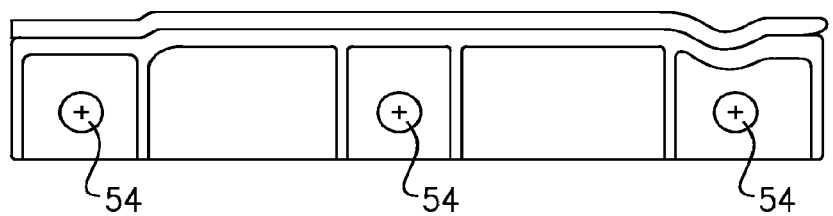
FIG. 6 is a plan view of a flange of the retractable exhaust liner segment.

A flange 52 is located at the interface of each segment 18A, 18B to define one or more fastener apertures 54 (FIG. 6). Each flange 52 may be further supported by a gusset 56 to receive a fastener assembly 58 such as a nut and bolt through the apertures 54. It should be appreciated that although two flanges 52 are illustrated for each segment 18A, 18B at a 180 degree displacement, it should be appreciate that only a single flange 52 may be utilized with radial flexing of the retractable exhaust liner segment 18 permitting movement thereof.

The retractable exhaust liner segment 18 may be manufactured of a nickel alloy base structure and a liner surface 60 coated with a high temperature ceramic material. It should be understood that any type of liner system such as a dual wall, single wall, cooled or uncooled will benefit herefrom. In another disclosed, non-limiting embodiment, the liner surface 60 defines a lap joint 62 adjacent to the interface between the segments 18A', 18B' (FIG. 8). The lap joint 62 further insulates the interface.

The retractable exhaust liner segment 18 includes a locating feature 64. The locating feature 64 may be an indentation or other undulation to axially index the retractable exhaust liner segment 18 with respect to the inner engine structure 44 and the exhaust liner 16. In another disclosed, non-limiting embodiment, the locating feature 64' defines a step surface 66 which provides an inner surface 68 which is generally parallel to the inner surfaces of the inner engine structure 44 and the exhaust liner 16 (FIG. 10).

Figure 12:
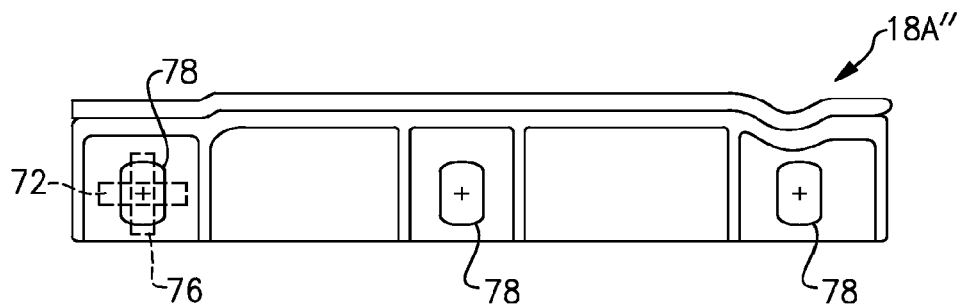
FIG. 12 is a plan view of a flange of one segment of the retractable exhaust liner segment of FIG. 11.
Figure 11:
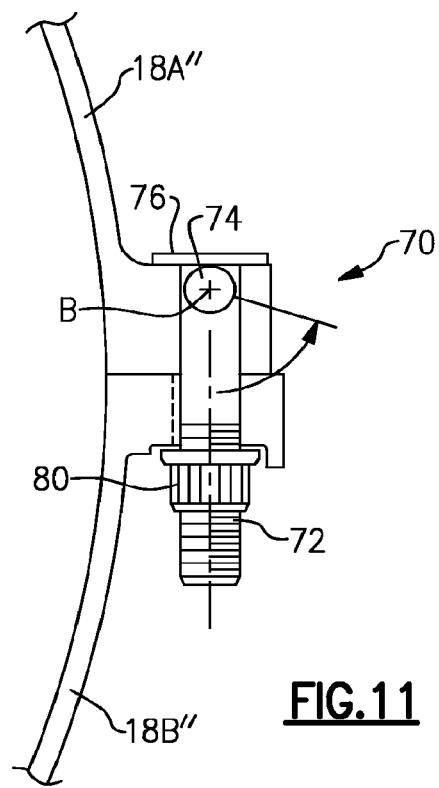
FIG. 11 is a side view of a flange of the retractable exhaust liner segment showing a fastener assembly according to another non-limiting embodiment.
Figure 13:
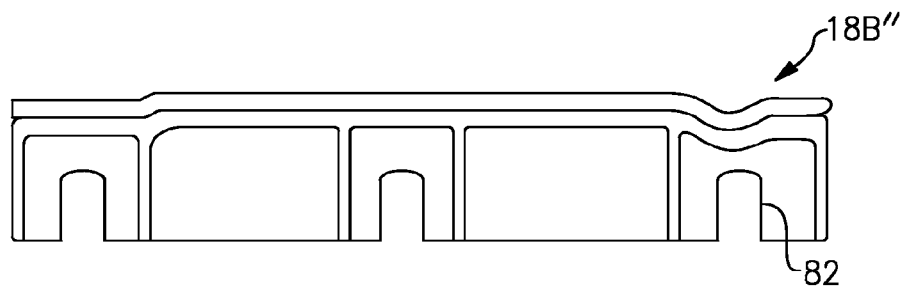
FIG. 13 is a plan view of a flange of one segment of the retractable exhaust liner segment of FIG. 11.

With reference to FIG. 11, another disclosed, non-limiting embodiment, includes a flange 70 that supports one or more captured fastener assemblies 72. Each captured fastener assembly 72 includes a T-Bolt 74 which is retained within one segment 18A' by a retainer 76. That is, the T-bolt 74 is pivotally retained within segment 18A'. Segment 18A' includes a slot 78 (FIG. 12) such that a nut 80 need only be loosened along the T-Bolt 74 then the T-bolt 74 pivoted along a bolt axis B through an open slot 82 in segment 18W' (FIG. 13) to assemble/disassemble segment 18B" from segment 18A" without any other separate components. This facilitates the reduction of Foreign Objet Damage (FOD).

With the best mode for carrying out the invention and the operation thereof having been described, certain additional features and benefits of the invention can now be more readily appreciated. For example, the retractable exhaust liner segment 18 facilitates tail cone clearance; provides a relatively uncomplicated design; eliminates seals and facilitates a selectively tight interface to provide backpressure and avoid wear from random vibrations.

It should be understood that relative positional terms such as "forward," "aft," "upper," "lower," "above," "below," and the like are with reference to the normal operational attitude of the vehicle and should not be considered otherwise limiting.

It should also be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A retractable exhaust liner segment comprising:
 a first retractable exhaust liner segment which defines a first flange;
 a second retractable exhaust liner segment which defines a second flange;

a fastener assembly received by said first flange and said second flange configured to mount said first retractable exhaust liner segment and said second retractable exhaust liner segment;

wherein a forward end of said retractable exhaust liner segment overlaps an aft end of an engine structure and an aft end of said retractable exhaust liner segment overlaps a forward end of an exhaust liner in an assembled position; and wherein a gap exists between said retractable exhaust liner segment and one of the engine structure and the exhaust liner as said retractable exhaust liner segment is moved along an axis in one direction to a disassembled position and the gap closes as said retractable exhaust liner segment is moved along the axis in other direction to the assembled position.

2. The retractable exhaust liner segment as recited in claim 1, wherein said first retractable exhaust liner segment and said second retractable exhaust liner segment are each approximately 180 degrees in circumference.

3. The retractable exhaust liner segment as recited in claim 1, wherein said fastener assembly includes a T-bolt.

4. The retractable exhaust liner segment as recited in claim 3, further comprising a retainer to retain said T-bolt within said first flange.

5. The retractable exhaust liner segment as recited in claim 4, wherein said second flange includes a slot to receive said T-bolt.

6. A propulsion system comprising:
a gas turbine engine along an axis;
an exhaust liner along the axis;
a retractable exhaust liner segment between said gas turbine engine and said exhaust liner;
wherein a forward end of the retractable exhaust liner segment overlaps an aft end of an engine structure and an aft end of said retractable exhaust liner segment overlaps a forward end of the exhaust liner in an assembled position; and
wherein a gap exists between said retractable exhaust liner segment and one of the engine structure and the exhaust liner as said retractable exhaust liner segment is moved along the axis in one direction to a disassembled position and the gap closes as said retractable exhaust liner segment is moved along the axis in other direction to the assembled position.

7. The system as recited in claim 6, wherein said retractable exhaust liner segment includes a first segment and a second segment each approximately 180 degrees in circumference.

8. The system as recited in claim 7, wherein said first segment defines a first flange and said second segment defines a second flange.

9. The system as recited in claim 8, further comprising a fastener assembly received by said first flange and said second flange to mount said first retractable exhaust liner segment and said second retractable exhaust liner segment.

10. The system as recited in claim 9, further comprising a retainer to retain a T-bolt within said first flange.

11. The retractable exhaust liner segment as recited in claim 10, wherein said second flange includes a slot to receive said T-bolt.

12. The retractable exhaust liner segment as recited in claim 6, wherein said retractable exhaust liner segment and said exhaust liner are mounted within an outer exhaust duct, said outer exhaust duct mountable to said gas turbine engine through an exhaust duct segment.

13. The system as recited in claim 12, wherein said gas turbine engine is movable relative to said exhaust liner in a direction transverse to said axis when said retractable exhaust liner segment located in an open position such that said retractable exhaust liner segment is telescoped over one of said portion of said gas turbine engine and said exhaust liner, and said retractable exhaust liner segment is configured to oppose relative movement between said portion of said gas turbine engine and said exhaust liner when said retractable exhaust liner segment is located in a closed position.

14. The system as recited in claim 12, wherein said portion of said gas turbine engine is an engine tail cone configured to direct engine core flow to said exhaust liner.

15. The system as recited in claim 14, wherein said exhaust liner and said gas turbine engine are selectively received in an airframe configured to oppose axial movement of said exhaust liner and said gas turbine engine along the axis in a direction away from said retractable exhaust liner segment.

16. The system as recited in claim 12, wherein said gas turbine engine includes a compressor section, a combustor section and a turbine section.

17. A method of maintaining a gas turbine engine comprising:
telescoping a retractable exhaust liner segment along an axis over one of a gas turbine engine and an exhaust liner such that said retractable exhaust liner segment defines a clearance gap between the other one of said gas turbine engine and said exhaust liner; and
moving one of said gas turbine engine or said exhaust liner transverse to the axis and through said clearance gap.

18. The method as recited in claim 17, wherein the exhaust liner is selectively received within an outer exhaust duct.

19. The method as recited in claim 17, wherein moving the retractable exhaust liner segment further comprises pivoting a T-bolt relative to the retractable exhaust liner segment.

20. The method as recited in claim 17, wherein moving one of the gas turbine engine or the exhaust liner transverse to the axis is performed vertically with respect to an airframe configured to receive the gas turbine engine, the exhaust liner and the retractable exhaust liner segment.

21. The retractable exhaust liner segment as recited in claim 5, wherein said T-bolt is pivotable through said slot.

* * * * *